(12) United States Patent
Lin et al.

(10) Patent No.: US 11,009,911 B2
(45) Date of Patent: May 18, 2021

(54) DISPLAY PANEL

(71) Applicant: HANNSTAR DISPLAY CORPORATION, Taipei (TW)

(72) Inventors: Sung-Chun Lin, Tainan (TW); Chen-Yin Su, Tainan (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 16/706,795

(22) Filed: Dec. 8, 2019

(65) Prior Publication Data

US 2020/0201390 A1 Jun. 25, 2020

(30) Foreign Application Priority Data

Dec. 20, 2018 (CN) .......................... 201811567075.2

(51) Int. Cl.
*G09G 1/00* (2006.01)
*G06F 1/16* (2006.01)

(52) U.S. Cl.
CPC .......... *G06F 1/1637* (2013.01); *G06F 1/1609* (2013.01); *G06F 1/1626* (2013.01)

(58) Field of Classification Search
None
See application file for complete search history.

(56) References Cited

U.S. PATENT DOCUMENTS

| 2010/0289994 A1* | 11/2010 | Nonaka | G09G 3/20 349/108 |
| 2018/0151663 A1* | 5/2018 | Kim | G09G 3/32 |
| 2018/0240856 A1* | 8/2018 | Kim | H01L 27/3276 |
| 2019/0088709 A1* | 3/2019 | Zeng | H01L 27/1218 |

* cited by examiner

*Primary Examiner* — Michael A Faragalla
(74) *Attorney, Agent, or Firm* — Winston Hsu

(57) ABSTRACT

The present invention provides a display panel including a non-rectangular display area. The display panel includes a first pixel row. The first pixel row includes a plurality of inner pixels and a plurality of end pixels. The inner pixels are disposed in the non-rectangular display area, and the end pixels are disposed between an end of the first pixel row and the inner pixels. An area of a display region of each of the end pixels is less than an area of a display region of each of the inner pixels. In the first pixel row, areas of a plurality of display regions of the end pixels are increased along a direction from the end of the first pixel row toward the inner pixels.

16 Claims, 7 Drawing Sheets

DISPLAY PANEL

CROSS REFERENCE TO RELATED APPLICATION

This application claims priority of China Application No. 201811567075.2, filed on Dec. 20, 2018. The entirety of the above-mentioned patent application is incorporated by reference herein and made a part of this specification.

BACKGROUND OF THE INVENTION

1. Field of the Invention

The present invention relates to a display panel, and more particularly, to a display panel including a non-rectangular display area.

2. Description of the Prior Art

Since display panels are thin and light, have low power consumption and no radiation pollution, they are widely used in various portable or wearable electronic products such as notebooks, smart phones and watches, as well as vehicle displays, to provide more convenient information transmission and display. In recent technology, display panels are also developed to have various shapes different from rectangle, such as circle and polygons, so that the design and application of the display panels are more flexible. However, when the conventional design method is applied to display panels with shapes different form rectangle, the curve portion of the edge of the display panel will be serrated, resulting in poor display quality. Therefore, improvement of the display quality of non-rectangular display panels is an urgent subject for technicians in the related field.

SUMMARY OF THE INVENTION

It is therefore an objective of the present invention to solve the above-mentioned technical problem by providing a display panel having a non-rectangular display area and improving the display quality of the display panel.

To solve the above technical problem, the present invention provides a display panel including a non-rectangular display area. The display panel includes a first pixel row. The first pixel row includes a plurality of inner pixels and a plurality of end pixels. The inner pixels are disposed in the non-rectangular display area, and the end pixels are disposed between an end of the first pixel row and the inner pixels. An area of a display region of each of the end pixels is less than an area of a display region of each of the inner pixels. In the first pixel row, areas of a plurality of display regions of the end pixels are increased along a direction from the end of the first pixel row toward the inner pixels.

The present invention further provides a display panel including a non-rectangular display area including a first pixel row, a second pixel row, a third pixel row, and a fourth pixel row. The $i^{th}$ pixel row includes a plurality of inner pixels and a plurality of end pixels, and i is an integer that is greater than or equal to 1 and is smaller than or equal to 4. The inner pixels are disposed in the non-rectangular display area, and the end pixels are disposed between an end of the $i^{th}$ pixel row and the inner pixels. An area of a display region of each of the end pixels is less than an area of a display region of each of the inner pixels. In the $i^{th}$ pixel row, areas of a plurality of display regions of the end pixels are increased along a direction from the end of the i-th pixel row toward the inner pixels.

The arrangement of pixels of the non-rectangular display panel of the present invention includes the above-mentioned characteristics. The problem of serration of the curve edge of the display area can be reduced, and the curve edge of the display area viewed by the user can be smoother, thereby improving the display quality of the non-rectangular display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
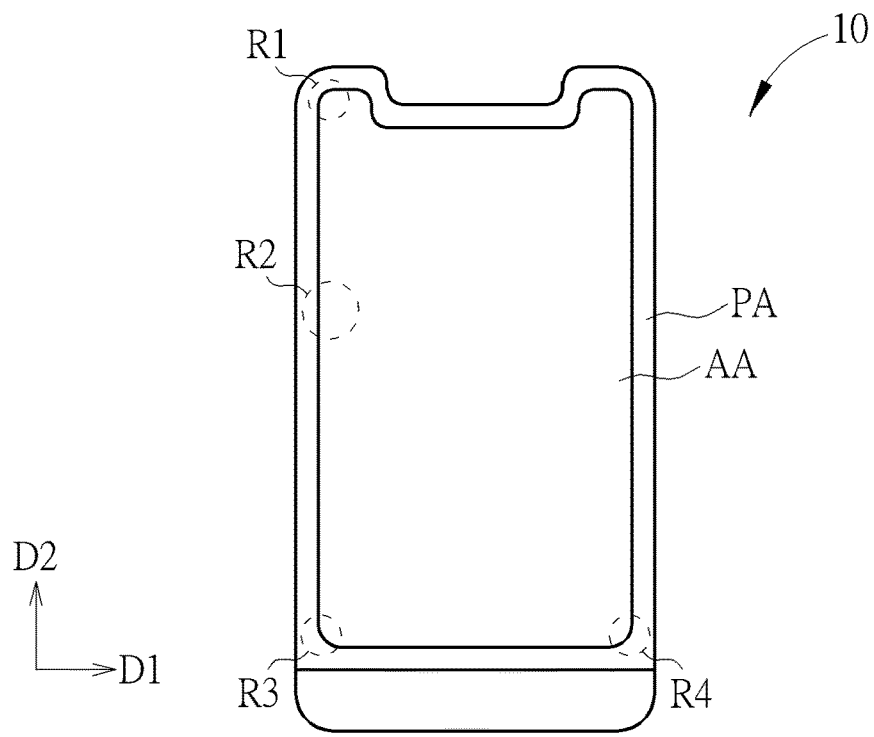
FIG. 1 is a schematic diagram illustrating a top view of a display panel according to a first embodiment of the present invention.

To provide a better understanding of the present invention to those skilled in the technology, preferred embodiments will be detailed as follows. The preferred embodiments of the present invention are illustrated in the accompanying drawings with numbered elements to elaborate on the contents and effects to be achieved. It should be noted that the drawings are simplified schematics, and therefore show only the components and combinations associated with the present invention, so as to provide a clearer description of the basic architecture or method of implementation. The components would be complex in reality. In addition, for ease of explanation, the components shown in the drawings may not represent their actual number, shape, and dimensions; details can be adjusted according to design requirements.

Figure 2:
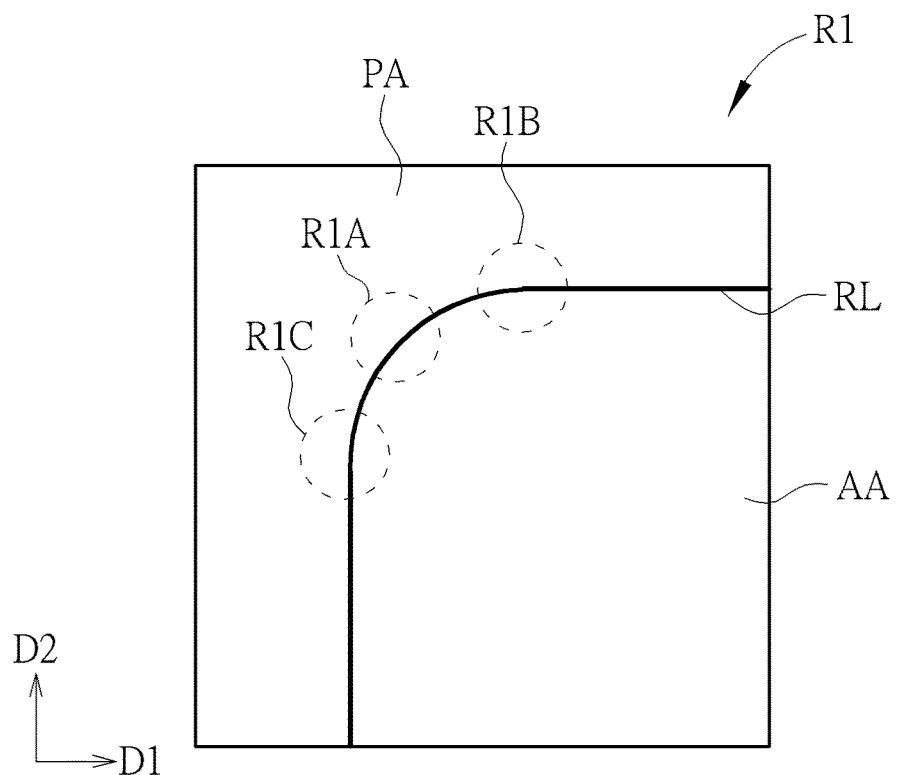
FIG. 2 is a schematic diagram illustrating an enlargement of a region R1 in FIG. 1.

Referring to FIG. 1, it is a schematic diagram illustrating a top view of a display panel according to a first embodiment of the present invention. A display panel 10 of this embodiment may be a liquid display panel, but not limited thereto. The display panel 10 of the present invention may be any other suitable type of display panel. As shown in FIG. 1, the display panel 10 includes a display area AA and a peripheral area PA disposed by at least one side of the display area AA. The peripheral area PA surrounds the display area AA in this embodiment, but not limited thereto. The display panel 10 of this embodiment can be a non-rectangular display panel, and portions of the contour of the display panel 10 may include curves. Additionally, the display area AA of the display panel 10 can be a non-rectangular display area. In this embodiment, a plurality of portions of the display area AA respectively located in regions R1, R3, R4 include curve edges, and a portion of the display area AA located in a region R2 includes a straight or nearly straight edge, but not limited thereto. Referring to FIG. 2, it is a schematic diagram illustrating an enlargement of a region R1 in FIG. 1. In FIG. 2, the edge of the display area AA can be represented by a reference line RL. Specifically, the reference line RL may be a contour of the display area AA determined by the designer in the design stage of the display panel 10 or a contour of the display area AA perceived by users while using the display device.

Figure 3:
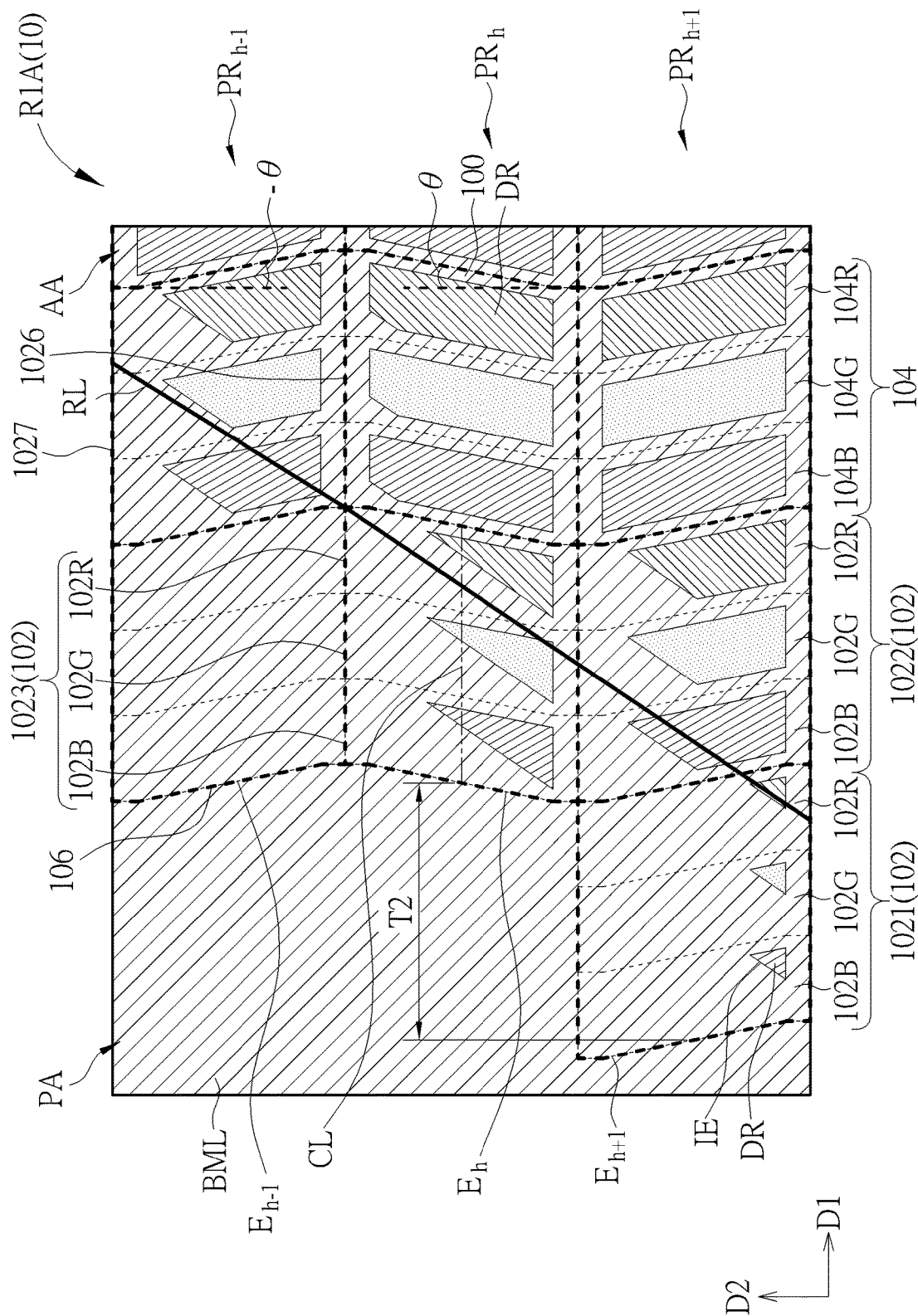
FIG. 3 is a schematic diagram illustrating an enlargement of an arrangement of pixels in a region R1A in FIG. 2 according to the first embodiment.

Referring to FIG. 3, it is a schematic diagram illustrating an enlargement of an arrangement of pixels in a region R1A in FIG. 2 according to the first embodiment. As shown in FIG. 2, a region R1A is a region of the display panel 10 located close to the middle of the curve line segment of the reference line RL. As shown in FIG. 3, the display panel 10 includes a plurality of sub-pixels 100 at least partly disposed in the display area AA and a plurality of sub-pixels 100 disposed in the peripheral area PA. In this embodiment, a pixel is composed of three sub-pixels 100, but not limited thereto. In other embodiments, a pixel may be composed of one sub-pixel, two sub-pixels, or more than three sub-pixels. In addition, the display panel 10 can include a plurality of scan lines (not shown) and a plurality of data lines (not shown). For example, the scan lines may extend along a first direction D1, and each of the scan lines may be disposed adjacent to a row of the sub-pixels 100. The data lines may extend along a direction where an included angle $\theta$ or $-\theta$ is included between the direction and a second direction D2, the extending direction of the data lines is not parallel to the first direction D1, and the scan lines cross the data lines and define multiple sub-pixels 100, but not limited thereto. In addition, each of the sub-pixels 100 may include a display region DR, and the display region DR may be defined by a region that is not covered by a shielding layer (such as a black matrix layer BML), but not limited thereto. For example, each of the sub-pixels 100 includes a shielding member, the shielding member may be a portion of the shielding layer and include an opening, and the display region DR of the sub-pixel 100 may be the region of the opening of the shielding member, but not limited thereto. In this embodiment, the first direction D1 is perpendicular to the second direction D2, but not limited thereto. In some embodiments, the first direction D1 may cross the second direction D2, and the included angle may not be 90 degrees.

In this embodiment, the shape of each sub-pixel 100 in the top view may be similar to the parallelogram, and each sub-pixel 100 has four side edges including top edge, bottom edge, left edge and right edge, but not limited thereto. For example, each sub-pixel 100 includes a scan line and a data line, the extending direction of the scan line is parallel to the top edge and the bottom edge of the sub-pixel 100, and the extending direction of the data line is parallel to the left edge and the right edge of the sub-pixel 100, but not limited thereto. As shown in FIG. 3, the top edge and the bottom edge of the sub-pixel 100 are parallel to the first direction D1, and the left edge and the right edge are not parallel to the first direction D1 nor the second direction D2. For example, in adjacent two pixel rows $PR_h$, $PR_{h-1}$, positive included angles $\theta$ (such as 7 degrees) are included between the second direction D2 and side edges (such as left edges and right edges) of parallelograms of the sub-pixels 100 in the pixel row $PR_h$, negative included angles $-\theta$ (such as $-7$ degrees) are included between the second direction D2 and side edges (such as left edges and right edges) of parallelograms the sub-pixels 100 in the pixel row $PR_{h-1}$, and the parallelograms of the sub-pixels 100 in the adjacent two rows are different but symmetrical to an imaginary line parallel to the first direction D1. Therefore, the left edges or the right edges of two adjacent sub-pixels 100 in the second direction D2 form a "<" shape or a ">" shape, and the sub-pixels 100 form serrated columns in the second direction D2, but not limited thereto. In some embodiments, the scan lines may extend along the first direction D1, the data lines may extend along the second direction D2, and the shape of each sub-pixel 100 may be a rectangle. In some embodiments, the scan lines may extend along the first direction D1, the shape of the data line of each sub-pixel 100 may be ">" or "<", and the ">"-shaped data lines and the "<"-shaped data lines may be disposed alternately along the second direction D2.

The display panel 10 of this embodiment includes a plurality of pixel rows extending along the first direction D1 and sequentially disposed along the second direction D2. Each pixel row in at least a portion of the plurality of pixel rows includes a plurality of inner pixels 104 and at least one end pixel 102, the end pixel 102 is located between an end of the pixel row and the inner pixels 104, and the end pixel 102 may be at least partly disposed in the display area AA. The at least a portion of the plurality of pixel rows may include, for example, the pixel rows each partly located in the region R1. For example, the end pixels 1021, 1022 are disposed between the end $E_{h+1}$ of the pixel row $PR_{h+1}$ and the inner pixels 104 of the pixel row $PR_{h+1}$, the end pixels 1023, 1026 are disposed between the end $E_h$ of the pixel row $PR_h$ and the inner pixels 104 of the pixel row $PR_h$, each of the end pixels 1021, 1022, 1023 is partly located in the display area AA, and the end pixel 1026 is completely located in the display area AA. In a pixel row including at least one end pixel 102 located between an end and the inner pixels 104 of the pixel row, the end pixel 102 located outermost in the pixel row is defined as the outermost end pixel 102 of the pixel row. In a pixel row where a plurality of end pixels 102 are disposed between an end and the inner pixels 104 of the pixel row, one or more end pixels 102 may be disposed between the outermost end pixel 102 and the inner pixels 104. For example, the one or more end pixels 102 may be disposed from a side edge of the outermost end pixel 102 to the inner pixels 104 along the first direction D1. In addition, in some pixel rows (such as the pixel row $PR_{h-1}$), a dummy pixel 106 is disposed between an end of the pixel row (such as the end $E_{h-1}$ of the pixel row $PR_{h-1}$) and the outermost end pixel 102 (such as the end pixel 1027), the black matrix layer BML can be used to completely cover the region of the dummy pixel 106, and therefore the dummy pixel 106 cannot display image, but it is not limited thereto.

Each of the end pixels 102 and the inner pixels 104 includes at least one sub-pixel. In this embodiment, each pixel is composed of three sub-pixels respectively corresponding to three different colors, but it is not limited thereto. As shown in FIG. 3, each of the end pixels 102 is composed of three end sub-pixels 102R, 102G, 102B, and each of the inner pixels 104 is composed of three inner sub-pixels 104R, 104G 104B. However, the number of the end sub-pixels in each of the end pixels 102 and the number of the inner sub-pixels in each of the inner pixels 104 are not limited in the present invention. In a pixel row where a plurality of end pixels 102 are disposed between an end of the pixel row and the inner pixels 104 of the pixel row, the areas of the display regions DR of the end sub-pixels 102R, 102G 102B in different end pixels 102 are not the same. For example, in the pixel row PR$_{h+1}$, the areas of the display regions DR of the end sub-pixels 102R, 102G 102B in the end pixel 1021 are respectively less than the areas of the display regions DR of the end sub-pixels 102R, 102G 102B in the end pixel 1022, and the areas of the display regions DR of the end sub-pixels 102R, 102G 102B in the end pixel 1022 are respectively less than the areas of the display regions DR of the inner sub-pixels 104R, 104G 104B in the inner pixels 104. Therefore, the area of the display region of each of the end pixels 1021, 1022 is less than the area of the display region of the inner pixel 104, and the area of the display region of the end pixel 1021 is less than the area of the display region of the end pixel 1022.

Note that in the embodiment where a pixel includes a plurality of sub-pixels, the display region of the pixel includes the display regions DR of the sub-pixels, and the area of the display region of the pixel is equal to the sum of the areas of the display regions DR of the sub-pixels. For example, in this embodiment, the area of the display region of the end pixel 102 is equal to the sum of the areas of the display regions DR of the end sub-pixels 102R, 102G 102B, and the area of the display region of the inner pixel 104 is equal to the sum of the areas of the display regions DR of the inner sub-pixels 104R, 104G 104B. In a pixel row where a plurality of end pixels 102 are disposed between an end of the pixel row and the inner pixels 104 of the pixel row, the areas of the display regions of the end pixels 102 are increased along a direction from the end of the pixel row toward the inner pixels 104 of the pixel row (e.g. along the first direction D1).

In some embodiments, in one of the pixel row, areas of display regions DR of the end sub-pixels corresponding to the same color are increased along the direction from the end of the pixel row toward the inner pixels 104 of the pixel row. For example, in one of the pixel row, areas of display regions DR of the end sub-pixels 102R corresponding to the same color (i.e., red) are increased along the direction from the end of the pixel row toward the inner pixels 104 of the pixel row.

In this embodiment, the display panel 10 includes a plurality of inner pixels 104 and a plurality of end pixels 102, and each of the end pixels 102 is disposed between an end of the corresponding pixel row and the inner pixels 104 of the corresponding pixel row. The areas of the display regions of the inner pixels 104 are the same, and the area of the display region of each of the end pixels 102 is greater than 0 and less than the area of the display region of each of the inner pixels 104. Additionally, each of the sub-pixels 100 includes a shielding member which is a portion of the shielding layer (such as the black matrix layer BML), the overlapping area of each of the regions of the end pixels 102 and the shielding layer is greater than the overlapping area of each of the regions of the inner pixels 104 and the shielding layer. The areas of the display regions of the end pixels 102 are increased along a direction from an end of the pixel row toward the inner pixels 104 of the pixel row, and the overlapping areas of the regions of the end pixels 102 and the shielding layer are decreased along the direction form the end of the pixel row toward the inner pixels 104 of the pixel row. Additionally, areas of the shielding members in the end pixels 102 are reduced along the direction from the end of the pixel row toward the inner pixels 104 of the pixel row.

In some embodiments, areas of the shielding members of the end sub-pixels corresponding to the same color are reduced along the direction from the end of the pixel row toward the inner pixels 104. For example, areas of the shielding members of the end sub-pixels 102R corresponding to the same color (i.e., red) are reduced along the direction from the end of the pixel row toward the inner pixels 104.

In some embodiments, each of the inner pixels 104 includes a plurality of inner sub-pixels (such as the inner sub-pixels 104R, 104G 104B) and each of the end pixels 102 includes a plurality of end sub-pixels (such as the end sub-pixels 102R, 102G 102B), and the area of the display region DR of the end sub-pixel is less than the area of the display region DR of the inner sub-pixel when the end sub-pixel is compared to the inner sub-pixel displaying the same color. For example, the areas of the display regions DR of the end sub-pixels 102R, 102G 102B respectively are less than the areas of the display regions DR of the inner sub-pixels 104R, 104G 104B. In addition, at least two of the areas of the display regions DR of the inner sub-pixels in each of the inner pixels 104 may be the same (e.g. the areas of the display regions DR of the inner sub-pixels 104R, 104G 104B are the same, or the areas of the display regions DR of two of the inner sub-pixels 104R, 104G 104B are the same), or the areas of the display regions DR of the inner sub-pixels in each of the inner pixels 104 may be different from each other (e.g. the areas of the display regions DR of the inner sub-pixels 104R, 104G 104B are different from each other). Similarly, at least two of the areas of the display regions DR of the end sub-pixels in each of the end pixels 102 may be the same (e.g. the areas of the display regions DR of the end sub-pixels 102R, 102G 102B in each of the end pixels 102 are the same, or the areas of the display regions DR of two of the end sub-pixels 102R, 102G 102B are the same), or the areas of the display regions DR of the end sub-pixels in each of the end pixels 102 may be different from each other (e.g. the areas of the display regions DR of the end sub-pixels 102R, 102G, 102B are different from each other). In some embodiments, at least one dummy pixel 106 may be disposed between an end of the pixel row and the outermost end pixel 102 of the pixel row. The region of the dummy pixel 106 can be completely covered by the shielding layer, and the area of the display region of the dummy pixel 106 can be 0.

In this embodiment, the display regions DR of the end sub-pixels 102R, 102G 102B of at least a portion of the end pixels 102 includes an inclined edge IE. The inclined edges IE of the end sub-pixels 102R, 102G 102B are not parallel to top edges, bottom edges, left edges and right edges of these end sub-pixels 102R, 102G 102B, and the inclined edges IE are not parallel to the extending directions of the scan lines and the data lines, but not limited thereto. For example, as shown in FIG. 2 and FIG. 3, the reference line RL is curved from the upper right to the lower left, and the inclined edge IE of the display region DR of each of the end sub-pixels 102R, 102G 102B in FIG. 3 may extend from the upper right to the lower left, which is similar to the curving direction or tangent direction of the reference line RL. Therefore, the edge of the display area AA of the display panel 10 viewed by the user will be similar to the reference line RL. The inclined edges IE may be straight lines or curve lines, but not limited thereto. As shown in FIG. 3, each of the end sub-pixels 102R, 102G 102B can include a centerline CL. Since the extending direction of the inclined edge IE of the display region DR of each of the end sub-pixels 102R, 102G 102B is similar to the curving direction or tangent direction of the reference line RL, the contour of the display area AA viewed by the user can be similar to the reference line RL, and the display region DR is asymmetrical with respect to the centerline CL. For example, in the display region DR of each of the end sub-pixels 102R, 102G 102B in the end pixel 1023, the shapes of a portion of the display region DR above the centerline CL and the other portion of the display region DR below the centerline CL are asymmetrical, and areas of the portion of the display region DR above the centerline CL and the other portion of the display region DR below the centerline CL are different. The inclined edges IE of the display regions DR of the end sub-pixels 102R, 102G 102B in an end pixel 102 may be parallel to each other, but not limited thereto. In addition, in a pixel row where a plurality of end pixels 102 are disposed between an end of the pixel row and the inner pixels 104 of the pixel row, the inclined edges IE of the display regions DR of the end sub-pixels 102R, 102G 102B in different end pixels 102 may be parallel to each other, but not limited thereto. In another aspect, the included angles included between the extending directions of the inclined edges IE of the display regions DR of the end sub-pixels 102R, 102G 102B in two adjacent pixel rows (such as the pixel row $PR_{h-1}$ and the pixel row $PR_h$, or the pixel row $PR_{h+1}$ and the pixel row $PR_h$) may be, but not limited to, less than or equal to 5 degrees, and the curve edge of the display area viewed by the user can be smoother.

Figure 4:
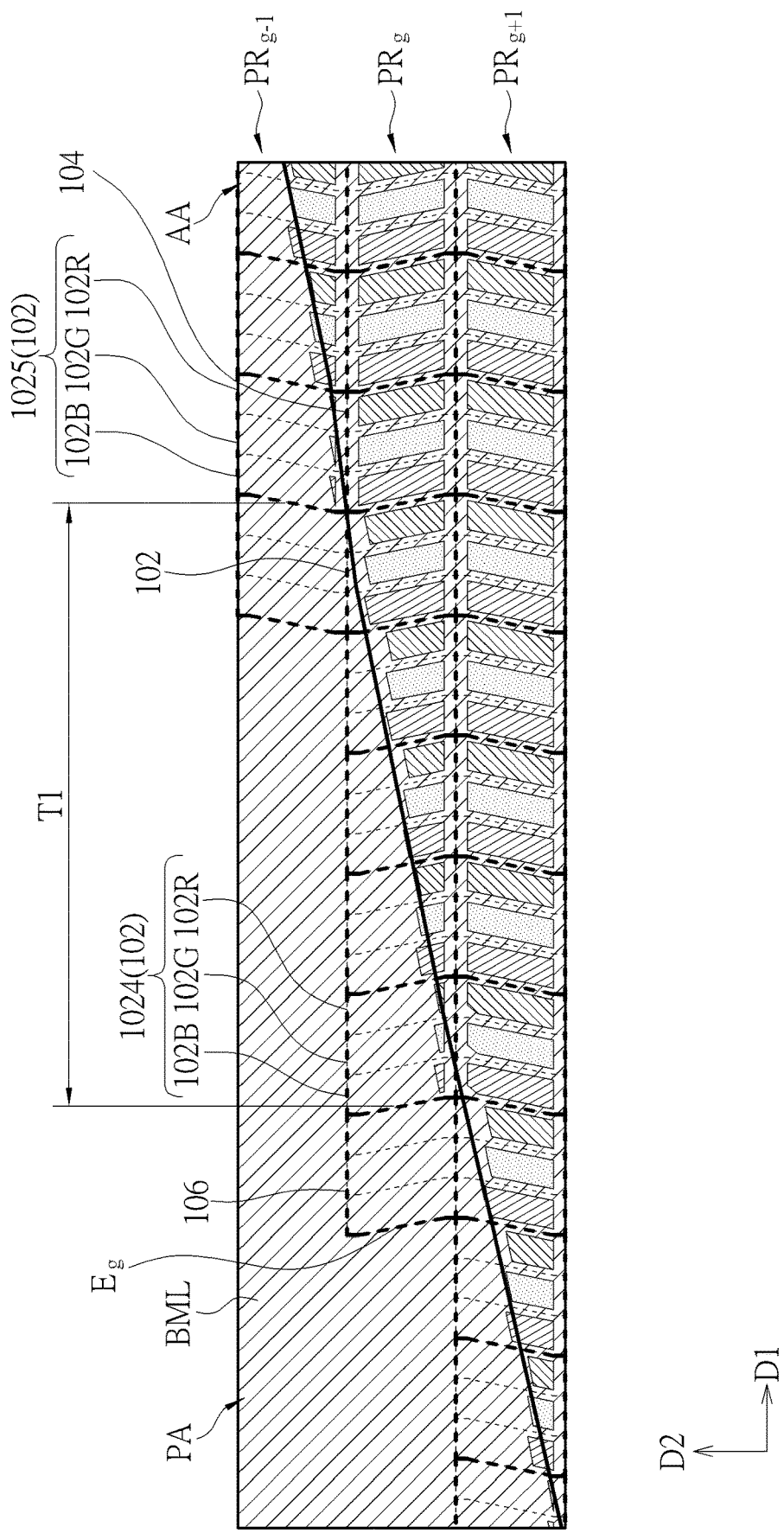
FIG. 4 is a schematic diagram illustrating an enlargement of an arrangement of pixels in a region R1B in FIG. 2 according to the first embodiment.

Referring to FIG. 2 to FIG. 4, FIG. 4 is a schematic diagram illustrating an enlargement of an arrangement of pixels in a region R1B in FIG. 2 according to the first embodiment. As shown in FIG. 2, the region R1B is corresponded to a portion of the curve line segment of the reference line RL, and the region R1B is closer to a portion of the reference line RL extending laterally (such as parallel to the first direction D1) compared to the region R1A. As shown in FIG. 4, a first distance T1 in the first direction D1 is included between the outermost end pixel 1024 of a pixel row $PR_g$ and the outermost end pixel 1025 of another pixel row $PR_{g-1}$ disposed adjacent to the pixel row $PR_g$. Specifically, the first distance T1 can be the distance in the first direction D1 and between the outermost end sub-pixel of the pixel row $PR_g$ (such as the end sub-pixel 102B in the end pixel 1024) and the outermost end sub-pixel of the pixel row $PR_{g-1}$ (such as the end sub-pixel 102B in the end pixel 1025), but not limited thereto. For example, as shown in FIG. 4, the first distance T1 may a distance in the first direction D1 and between the midpoint of the outer side edge (such as the left edge) of the end sub-pixel 102B in the end pixel 1024 and the midpoint of the outer side edge (such as the left edge) of the end sub-pixel 102B in the end pixel 1025, but not limited thereto. In another aspect, as shown in FIG. 3, a second distance T2 in the first direction D1 is included between the outermost end pixel 1023 of the pixel row $PR_h$ and the outermost end pixel 1021 of another pixel row $PR_{h+1}$ disposed adjacent to the pixel row $PR_h$. The second distance T2 can be the distance in the first direction D1 and between the outermost end sub-pixel of the pixel row $PR_h$ (such as the end sub-pixel 102B in the end pixel 1023) and the outermost end sub-pixel of the pixel row $PR_{h+1}$ (such as the end sub-pixel 102B in the end pixel 1021), but not limited thereto. The measuring method of the second distance T2 can be the same as that of the first distance T1.

As shown in FIG. 3 and FIG. 4, the first distance T1 in the region R1B is greater than the second distance T2 in the region R1A. The second distance T2 in the region R1A is approximately equal to the width of three end sub-pixels (i.e. the width of one end pixel 102), and the first distance T1 in the region R1B is approximately equal to the width of fifteen end sub-pixels (i.e. the width of five end pixels 102). In addition, the number of the end pixels 102 in the pixel row $PR_g$ in the region R1B is greater than the number of the end pixels 102 in the pixel row $PR_{h+1}$ in the region R1A. The number of the end pixels 102 located between the end $E_g$ and the inner pixels 104 of the pixel row $PR_g$ is five, and the number of the end pixels 102 located between the end $E_{h+1}$ and the inner pixels 104 of the pixel row $PR_{h+1}$ is two. In this embodiment, the distance between the outermost end sub-pixels in adjacent pixel rows is increased and the number of the end pixels 102 located between an end and the inner pixels 104 of the pixel row is also increased when the reference line RL is gradually changed from the curve line segment to the laterally extending line segment (i.e. when the tangent direction of the reference line RL is gradually approached to be parallel to the first direction D1). In another aspect, the distance between the outermost end sub-pixels in adjacent pixel rows is decreased and the number of the end pixels 102 located between an end of the pixel row and the inner pixels 104 of the pixel row is also decreased when the reference line RL is gradually changed from the curve line segment to the longitudinally extending line segment (e.g. parallel to the second direction D2). According to the description above, the number of the end pixels 102 located between an end of a pixel row and the inner pixels 104 of the pixel row is related to the degree of curving of the reference line RL, and the numbers the end pixels 102 in different pixel rows which are located in different regions (e.g. the regions R1A, R1B, R1C) may be different. In addition, the region R1B is closer to a portion of the reference line RL extending laterally compared to the region R1A, the included angle between the first direction D1 and the direction from the outermost end pixel 1021 of the pixel row $PR_{h+1}$ toward the outermost end pixel 1023 of the pixel row $PR_h$ (e.g. the direction from the midpoint of the left edge of the outermost end pixel 1021 of the pixel row $PR_{h+1}$ toward the midpoint of the left edge of the outermost end pixel 1023 of the pixel row $PR_h$) is greater than the included angle between the first direction D1 and the direction from the outermost end pixel 1024 of the pixel row $PR_g$ toward the outermost end pixel 1025 of the pixel row $PR_{g-1}$. Therefore, when the reference line RL is gradually changed from the curve line segment to the laterally extending line segment, the included angle between the first direction D1 and the direction from the outermost end pixel of one of adjacent pixel rows toward the outermost end pixel of the other one of the adjacent pixel rows is decreased. In another aspect, when the reference line RL is gradually changed from the curve line segment to the longitudinally extending line segment, the included angle between the first direction D1 and the direction from the outermost end pixel of one of adjacent pixel rows toward the outermost end pixel of the other one of the adjacent pixel rows is increased. The distance between the outermost end sub-pixels in the adjacent pixel rows and the number of the end sub-pixels in the pixel rows mentioned above are presented for explanation purpose only, and the present invention is not limited thereto.

In another aspect, the display panel 10 includes a first pixel row (such as the pixel row $PR_{g-1}$ in FIG. 4), a second pixel row (such as the pixel row $PR_g$ in FIG. 4), a third pixel row (such as the pixel row $PR_h$ in FIG. 3), and a fourth pixel row (such as the pixel row $PR_{h+1}$ in FIG. 3). The first pixel row and the second pixel row are adjacent to each other along the second direction D2, and the third pixel row and the fourth pixel row are adjacent to each other along the second direction D2. The distance (such as the first distance T1 in FIG. 4) which is included between the outermost end pixel 102 of the first pixel row and the outermost end pixel 102 of the second pixel row is greater than the distance (such as the second distance T2 in FIG. 3) which is included between the outermost end pixel 102 of the third pixel row and the outermost end pixel 102 of the fourth pixel row. The number of the end pixels 102 disposed between an end of the second pixel row and the inner pixels 104 of the second pixel row is greater than the number of the end pixels 102 disposed between an end of the fourth pixel row and the inner pixels 102 of the fourth pixel row (e.g. five end pixels 102 are included between the end $E_g$ and the inner pixels 104 of the pixel row $PR_g$, and two end pixels 102 are included between the end $E_{h+1}$ and the inner pixels 104 of the pixel row $PR_{h+1}$). Accordingly, the joint of portions of the edge of the display area having different curvatures viewed by the user can be smoother. Although the above description takes the pixel rows $PR_{g-1}$, $PR_g$ in FIG. 4 and the pixel rows $PR_h$, $PR_{h+1}$ in FIG. 3 as the first to the fourth pixel rows, respectively, but not limited thereto. For example, the first to the fourth pixel rows respectively may be the pixel rows $PR_g$, $PR_{g+1}$ in FIG. 4 and the pixel rows $PR_{h-1}$, $PR_h$ in FIG. 3, but not limited thereto. The distance between the outermost end pixels in adjacent pixel rows and the number of end pixels in one of the adjacent pixel rows mentioned above are presented for explanation purpose only, and the present invention is not limited thereto.

The problem of serration of the curve edge of the display area AA viewed by the user can be reduced by the disposition of the aforementioned end pixels 102, thereby improving the display quality of the non-rectangular display panel 10. The design flow of this embodiment can be illustrated as follows: a plurality of pixels are disposed as a plurality of pixel rows and a plurality of pixel columns, the reference line RL crosses a portion of the pixels when viewed in a direction perpendicular to the surface of the display panel 10, and the pixels crossed with the reference line RL are designed as the aforementioned end pixels 102. When a plurality of end pixels 102 are disposed between an end of a pixel row and the inner pixels 104 of the pixel row, the areas of the display regions of the end pixels 102 are increased along a direction from the end of the pixel row toward the inner pixels 104 of the pixel row. For example, as shown in FIG. 3, the areas of the display regions DR of the end sub-pixels 102R, 102G 102B in the end pixel 1021 are respectively less than 50% of the areas of the display regions DR of the inner sub-pixels 104R, 104G 104B in the inner pixel 104, and the areas of the display regions DR of the end sub-pixels 102R, 102G, 102B in the end pixel 1022 adjacent to the end pixel 1021 are respectively greater than 50% of the areas of the display regions DR of the inner sub-pixels 104R, 104G 104B in the inner pixel 104, but not limited thereto. Therefore, the areas of the display regions of the end pixels 102 between an end of a pixel row and the inner pixels 104 of the pixel row are gradually changed along a direction from the end of the pixel row toward the inner pixels 104 of the pixel row, and the curve edge of the display area AA viewed by the user can be smoother.

In some embodiments, the actual contour of the display region of the pixel array can be checked again after the display panel 10 is designed according to the above method. At this time, the shielding layer (such as the black matrix layer BML) near the edge of the display region can be adjusted again so that the edge of the display region viewed by the user can conform to the shape of the initial design (such as the shape defined by the reference line RL). For example, as shown in FIG. 3, the reference line RL crosses the end pixel 1023 but does not cross the pixel adjacent to the right edge of the end pixel 1023 in the pixel row $PR_h$. Since the black matrix layer BML covers more than half of the area of the end pixel 1023 (i.e. the area of the display region of the end pixel 1023 is less than half of the area of the end pixel 1023), and if the adjacent pixel disposed on the right edge of the end pixel 1023 in the pixel row $PR_h$ is designed as the inner pixel 104, the user will notice that a portion of a displayed image located on a portion of an edge of the display area AA is abnormal because the difference of the areas of the display regions between adjacent two pixels is too large. Therefore, the adjacent pixel disposed on the right edge of the end pixel 1023 in the pixel row $PR_h$ is designed as the end pixel 1026 in this embodiment, and the area of the display region of the end pixel 1026 is greater than the area of the display region of the end pixel 1023 but less than the area of the display region of the inner pixel 104, so that the areas of the display regions of the pixels in the pixel row $PR_h$ are gradually changed along a direction from the end $E_h$ of the pixel row $PR_h$ toward the inner pixels 104 of the pixel row $PR_h$, thereby enabling the display panel 10 to have better visual effect. The above design flow is only an example, and the present invention is not limited thereto.

The display panel of the present invention is not limited to the aforementioned embodiment. The following description continues to detail other embodiments. To simplify the description and show the difference between other embodiments and the above-mentioned embodiment, identical components in each of the following embodiments are marked with identical symbols, and the identical features will not be redundantly described.

Figure 5:
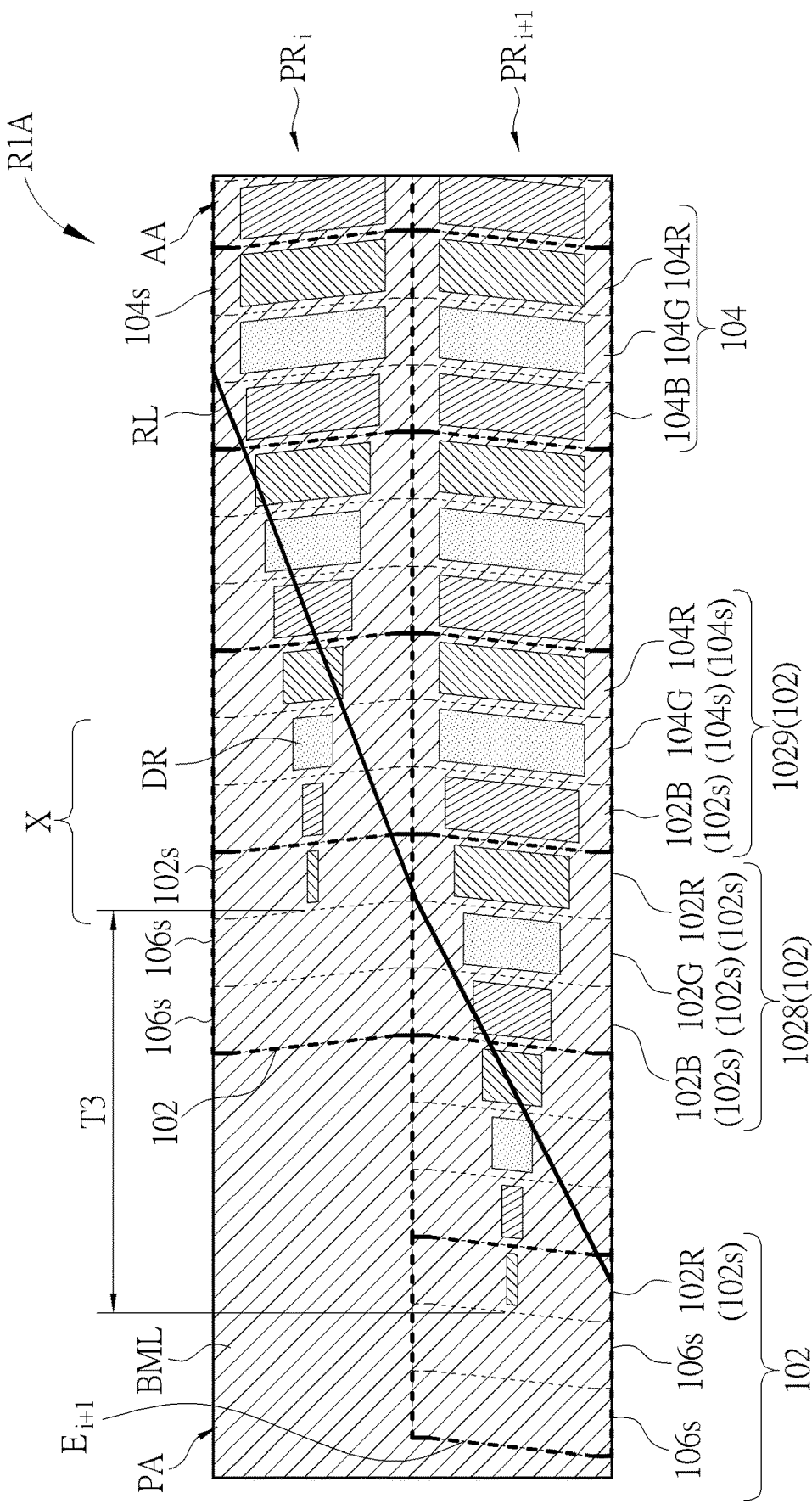
FIG. 5 is a schematic diagram illustrating an enlargement of an arrangement of pixels in a region R1A in FIG. 2 according to a second embodiment.
Figure 6:
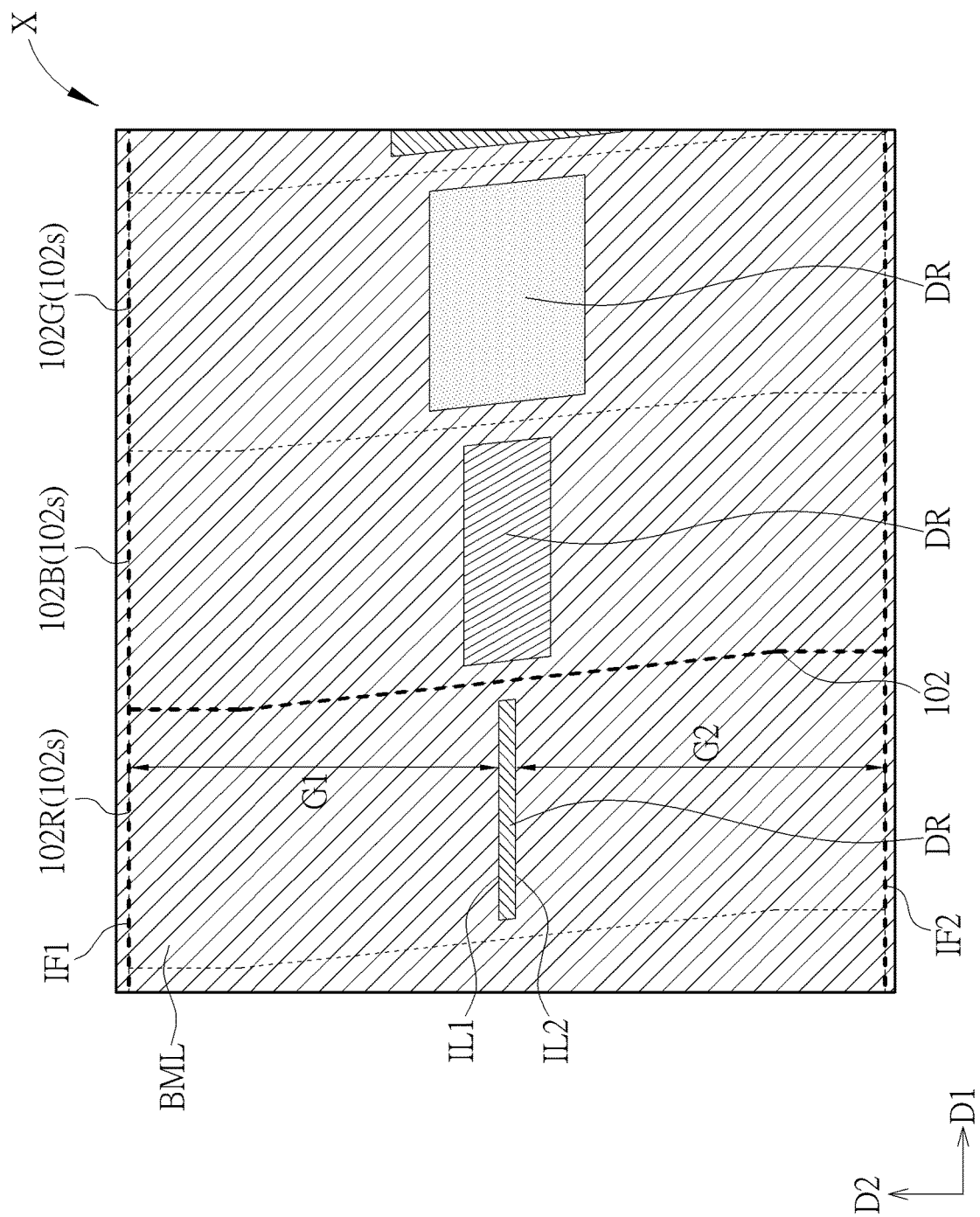
FIG. 6 is a schematic diagram illustrating an enlargement of a region X in FIG. 5.

Referring to FIG. 5 and FIG. 6, FIG. 5 is a schematic diagram illustrating an enlargement of an arrangement of pixels in a region R1A in FIG. 2 according to a second embodiment, and FIG. 6 is a schematic diagram illustrating an enlargement of a region X in FIG. 5. In this embodiment, at least one end sub-pixel 102s is disposed between an end of a pixel row and the inner sub-pixels 104s of the pixel row, and the area of the display region DR of the end sub-pixel 102s is greater than 0 and less than the area of the display region DR of the inner sub-pixel 104s. In a pixel row where a plurality of end sub-pixels 102s are disposed between an end of the pixel row and the inner sub-pixels 104s of the pixel row, the areas of the display regions DR of the end sub-pixels 102s are increased along a direction from the end of the pixel row to the inner sub-pixels 104s of the pixel row.

For example, in the pixel row $PR_{i+1}$ in FIG. 5, a plurality of end sub-pixels 102s are disposed between an end $E_{1+1}$ and the inner sub-pixels 104s of the pixel row $PR_{i+1}$, the areas of the display regions DR of the end sub-pixels 102s are increased along a direction from the end $E_{1+1}$ to the inner sub-pixels 104s of the pixel row $PR_{i+1}$ (i.e. the first direction D1). Specifically, the end sub-pixel 102s located outermost in the pixel row is defined as the outermost end sub-pixel 102s. In another aspect, the areas of the end sub-pixels 102s covered by the black matrix layer BML are decreased along a direction from the end of the pixel row toward the inner sub-pixels 104s of the pixel row, or the areas of the shielding members of the end sub-pixels 102s are reduced along the direction from the end of the first pixel row toward the inner pixels 104s of the pixel row. Accordingly, the areas of the display regions of the pixels in the region R1A are gradually changed from outside to inside, thereby enabling the display panel 10 to have better visual effect.

In FIG. 6, the end sub-pixel 102R is the outermost end sub-pixel 102s in the pixel row $PR_i$ and the black matrix layer BML covers the region of the end sub-pixel 102R from the top edge and the bottom edge of the end sub-pixel 102R toward the centerline of the end sub-pixel 102R. In addition, the top edge and the bottom edge of the display region DR of the end sub-pixel 102R (i.e. the opening of the black matrix layer BML) are parallel to the first direction D1, and the display region DR of the end sub-pixel 102R can be the parallelogram, but not limited thereto. In other embodiments, the included angle included between the first direction D1 and at least one of the top edge and the bottom edge of the display region DR of the end sub-pixel 102R is not equal to 0. In addition, in the first direction D1, the areas of the shielding members (portions of the black matrix layer BML) of the end sub-pixels 102s are decreased, and the areas of the display regions DR of the end sub-pixels 102S are increased.

For example, as shown in FIG. 6, each of the end sub-pixels 102R, 102B, 102G includes two opposite side edges IF1, IF2 (such as the top edge and the bottom edge of the end sub-pixel), and the display region DR of each of the end sub-pixels 102R, 102B, 102G (i.e. the region that is not covered by the black matrix layer BML) includes two opposite side edges ILL IL2 (such as the top edge and the bottom edge of the display region DR, or the top edge and the bottom edge of the opening of the black matrix layer BML). In each of the end sub-pixels 102R, 102B, 102G a distance G1 is included between the side edge IF1 and the side edge IL1 in the second direction D2, and a distance G2 is included between the side edge IF2 and the side edge IL2 in the second direction D2. Preferably, the distance G1 and the distance G2 are approximately the same, but not limited thereto. As shown in FIG. 6, the top edge and the bottom edge of the display region DR of the end sub-pixel 102B are respectively higher and lower than the top edge and the bottom edge of the display region DR of the outermost end sub-pixel 102R in the direction D2, and the top edge and the bottom edge of the display region DR of the end sub-pixel 102G are respectively higher and lower than the top edge and the bottom edge of the display region DR of the end sub-pixel 102B in the direction D2, such that in a pixel row where a plurality of end sub-pixels 102s are disposed between an end of the pixel row and the inner pixels 104 of the pixel row, the distances G1 and the distances G2 in the end sub-pixels 102s are reduced along a direction from the end of the pixel row to the inner sub-pixels 104s of the pixel row, and the areas of the display regions DR of the end sub-pixels 102s are increased along a direction from the end of the pixel row to the inner sub-pixels 104s of the pixel row. Therefore, the areas of the display regions DR of the end sub-pixels 102R, 102G 102B in the same end pixel 102 may be different in this embodiment.

As shown in FIG. 5, the top edges and the bottom edges of the display regions DR of the end sub-pixels 102R, 102G 102B in different pixel rows may be parallel to each other, but not limited thereto. In some pixel rows, at least one sub-pixel may be additionally disposed on the outer side edge (such as the left edge) of the outermost end sub-pixel 102s. For example, two sub-pixels are disposed on the left edge of the outermost end sub-pixel 102s in the pixel row $PR_j$. The regions of these sub-pixels are completely covered by the black matrix layer BML and cannot display images, and they can be regarded as dummy sub-pixels 106s. Accordingly, the regions of the dummy sub-pixels 106s are completely covered by the shielding layer, and the display areas of the dummy sub-pixels 106s are 0. For example, in the pixel row $PR_{i+1}$ of FIG. 5, the regions of two sub-pixels disposed on the left edge of the sub-pixel 102R in the outermost end pixel 102 (such as the leftmost end pixel) are completely covered by the black matrix layer BML, and the sub-pixel 102R is partially covered by the black matrix layer BML, which means that the outermost end pixel 102 includes two dummy sub-pixels 106s and one end sub-pixel 102s. Similarly, the outermost end pixel 102 (such as the leftmost end pixel) in the pixel row $PR_i$ includes two dummy sub-pixels 106s and one end sub-pixel 102s.

The numbers of the dummy sub-pixels 106s and the end sub-pixels 102s of the outermost end pixels 102 in the pixel rows are not limited in the present invention. For example, the outermost end pixel 102 in the pixel row may include two dummy sub-pixels 106s and one end sub-pixel 102s in the embodiment that three sub-pixels are included in each pixel (such as the embodiment in FIG. 5). In some pixel rows, the outermost end pixel 102 in the pixel row may include one dummy sub-pixel 106s and two end sub-pixels 102s. For example, the reference line RL crosses two sub-pixels in the outermost end pixel 102, these two sub-pixels are designed as the end sub-pixels 102s, and the sub-pixel that is not crossed with the reference line RL is designed as the dummy sub-pixel 106s. In some pixel rows, the outermost end pixel 102 in the pixel row may include three end sub-pixels 102s and may not include the dummy sub-pixel 106s. For example, the reference line RL crosses three sub-pixels in the outermost end pixel 102. Therefore, in this embodiment, the areas of the display regions DR of the sub-pixels 102R, 102G 102B in the end pixel 102 may be different from each other, or two of the areas of the display regions DR of the sub-pixels 102R, 102G 102B in an end pixel 102 may be the same and equal to 0. For example, in the pixel row $PR_{1+1}$, the areas of the display regions DR of two sub-pixels (i.e. dummy sub-pixels 106s) in the outermost end pixel 102 are equal to 0, and the area of the display region DR of one sub-pixel (i.e. end sub-pixels 102R) in the outermost end pixel 102 is greater than 0. In the pixel row $PR_{1+1}$, the areas of the display regions DR of the sub-pixels 102B, 102G 102R in the end pixel 102 adjacent to left edge of the outermost end pixel 102 are greater than 0 and different from each other.

Figure 7:
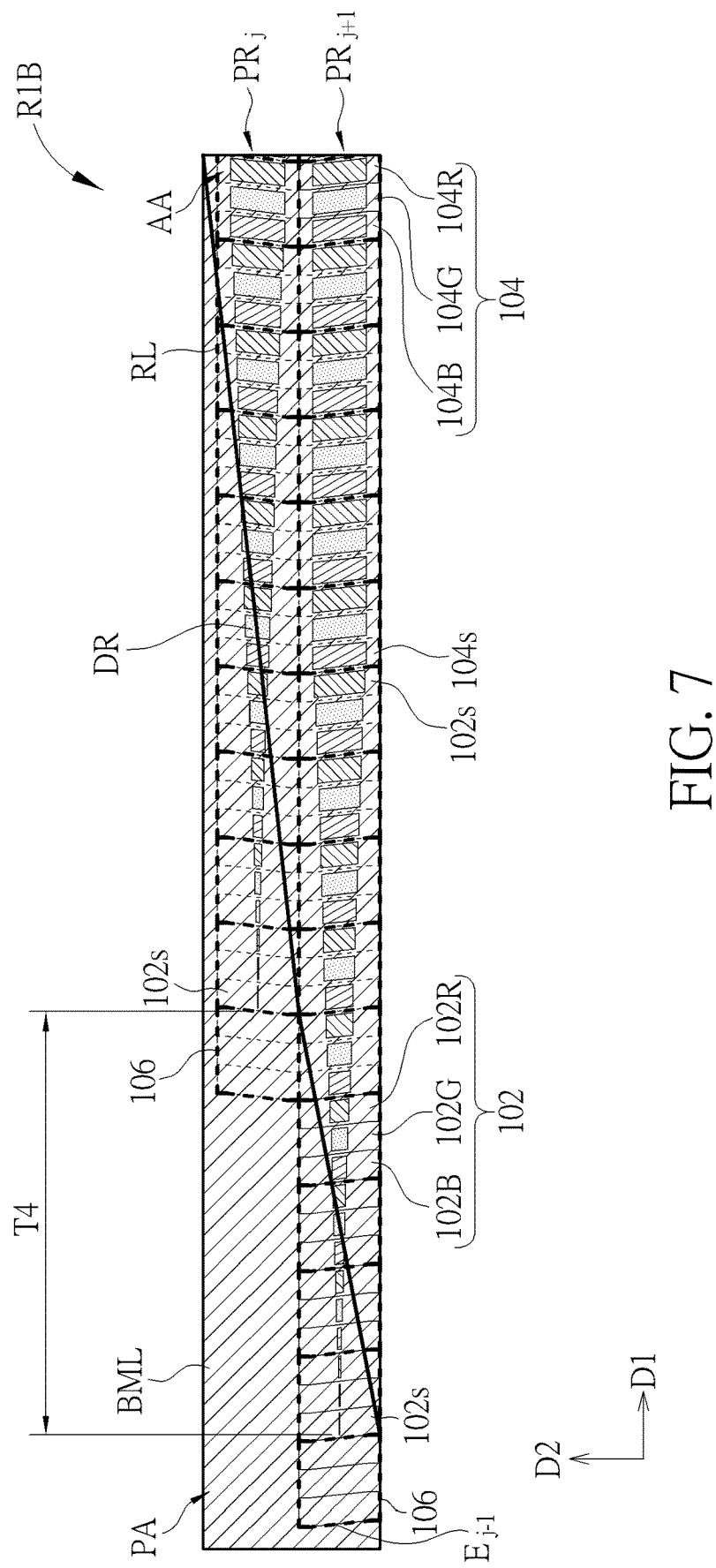
FIG. 7 is a schematic diagram illustrating an enlargement of an arrangement of pixels in a region R1B in FIG. 2 according to the second embodiment.
Figure 8:
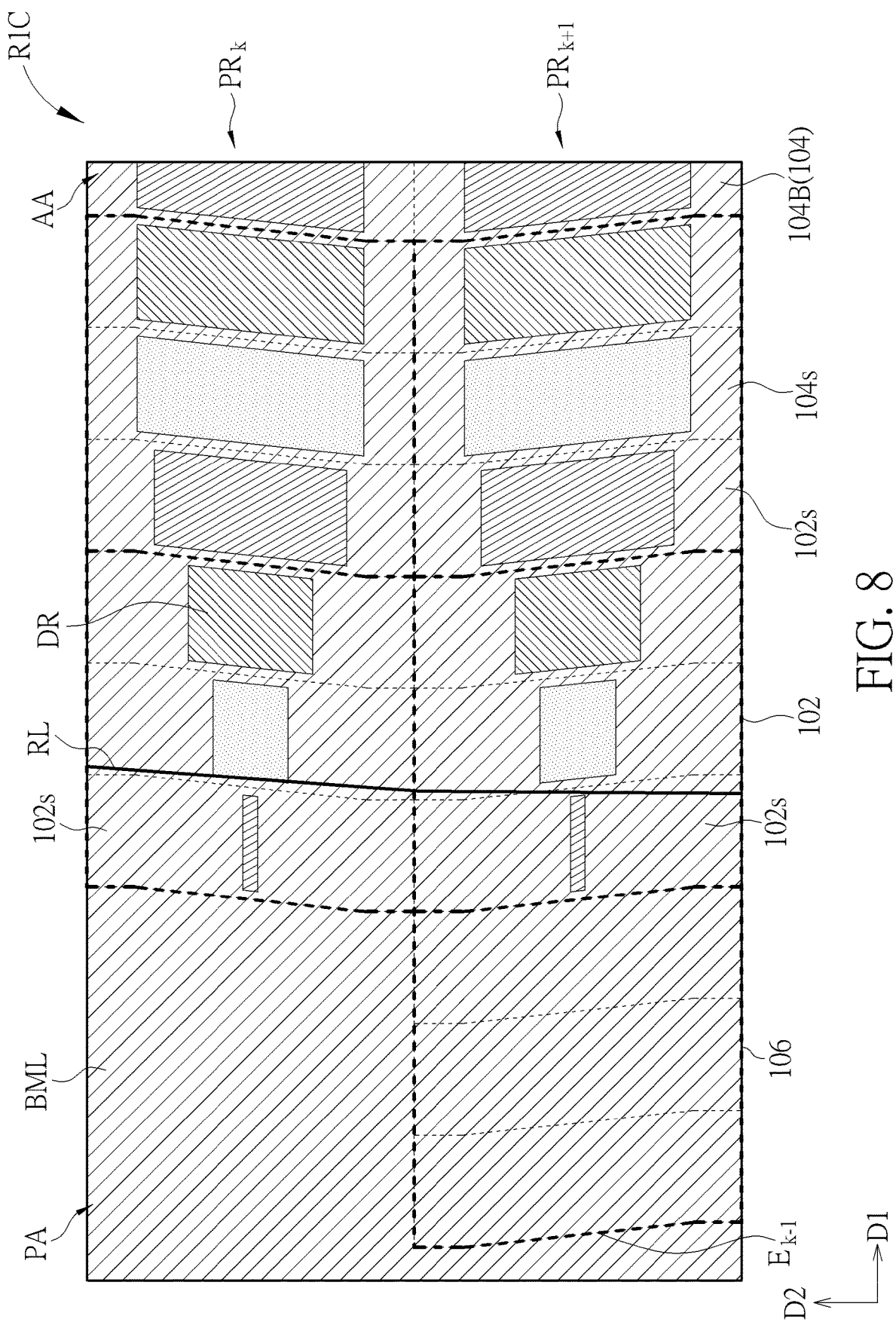
FIG. 8 is a schematic diagram illustrating an enlargement of an arrangement of pixels in a region R1C in FIG. 2 according to the second embodiment.

Referring to FIG. 5 to FIG. 8, FIG. 7 illustrates an enlargement of an arrangement of pixels in a region R1B in FIG. 2, and FIG. 8 illustrates an enlargement of an arrangement of pixels in a region R1C in FIG. 2 according to the second embodiment. As shown in FIG. 7 and FIG. 8, the dummy pixels 106 are disposed on the outer side edge (such as the left edge) of the outermost end pixels 102 in the pixel rows $PR_j$, $PR_{1+1}$, $PR_{k+1}$, but not limited thereto.

In FIG. 5, a third distance T3 is included between the outermost end sub-pixel 102s of the pixel row $PR_i$ and the outermost end sub-pixel 102s of another pixel row $PR_{i+1}$ disposed adjacent to the pixel row $PR_i$ and the third distance T3 may be measured along the first direction D1. For example, the third distance T3 may be measured from the midpoint of the outer side edge (such as the left edge) of the end sub-pixel 102s of the pixel row $PR_i$ to the midpoint of the outer side edge (such as the left edge) of the end sub-pixel 102s of the pixel row $PR_{i+1}$, but not limited thereto. Referring to FIG. 7, it is a schematic diagram illustrating an enlargement of an arrangement of pixels in a region R1B in FIG. 2 according to the second embodiment. As shown in FIG. 7, a fourth distance T4 is included between the outermost end sub-pixel 102s of the pixel row $PR_j$ and the outermost end sub-pixel 102s of another pixel row $PR_{j+1}$ disposed adjacent to the pixel row $PR_j$, and the fourth distance T4 may be measured along the first direction D1. Additionally, the measuring method of the fourth distance T4 can be the same as that of the third distance T3.

As shown in FIG. 5 and FIG. 7, the fourth distance T4 in the region R1B is greater than the third distance T3 in the region R1A. The third distance T3 in the region R1A is approximately equal to the width of six end sub-pixels 102s, and the fourth distance T4 in the region R1B is approximately equal to the width of fifteen end sub-pixels 102s. In addition, the number of the end sub-pixels in the pixel row $PR_{j+1}$ in the region R1B is greater than the number of the end sub-pixels in the pixel row $PR_{i+1}$ in the region R1A. The number of the end sub-pixels 102s located between the end $E_{j+1}$ and the inner sub-pixels 104s of the pixel row $PR_{j+1}$ is twenty-seven, and the number of the end sub-pixels 102s located between the end $E_{1+1}$ and the inner sub-pixels 104s of the pixel row $PR_{i+1}$ is eight. In this embodiment, the distance between the outermost end sub-pixels in adjacent pixel rows is increased and the number of the end sub-pixels located between an end of the pixel row and the inner sub-pixels 104 of the pixel row is also increased when the reference line RL is gradually changed from the curve line segment to the laterally extending line segment (e.g. the line segment parallel to the first direction D1). Accordingly, the edge of the display area that is gradually changed from the curved line segment to the laterally extending line segment viewed by the user can be smoother.

Referring to FIG. 8, it is a schematic diagram illustrating an enlargement of an arrangement of pixels in a region R1C in FIG. 2 according to the second embodiment. As shown in FIG. 2, the region R1C is corresponded to a portion of the curve line segment of the reference line RL, and the region R1C is closer to a portion of the reference line RL extending longitudinally (such as parallel to the second direction D2) compared to the region R1A. As shown in FIG. 8, the outermost end sub-pixel 102s of the pixel row $PR_k$ and the outermost end sub-pixel 102s of another pixel row $PR_{k+1}$ disposed adjacent to the pixel row $PR_k$ can be approximately aligned in the second direction D2. For example, the bottom edge of the outermost end sub-pixel 102s in the pixel row $PR_k$ can be overlapped with the top edge of the outermost end sub-pixel 102s in the pixel row $PR_{k+1}$. Therefore, the distance between the outermost end sub-pixel 102s in the pixel row $PR_k$ and the outermost end sub-pixel 102s in another pixel row $PR_{k+1}$ adjacent to the pixel row $PR_k$ can be regarded as zero. In another aspect, the distance between the outermost end sub-pixel 102s in the pixel row $PR_k$ and the outermost end sub-pixel 102s in another pixel row $PR_{k+1}$ adjacent to the pixel row $PR_k$ is less than the third distance T3 in the region R1A (referring to FIG. 5).

In addition, as shown in FIG. 5 and FIG. 8, the number of the end sub-pixels 102s in the pixel row $PR_{i+1}$ in the region R1A is greater than the number of the end sub-pixels 102s in the pixel row $PR_{k+1}$ in the region R1C. The number of the end sub-pixels 102s located between the end $E_{i+1}$ and the inner sub-pixels 104s of the pixel row $PR_{i+1}$ is eight, and the number of the end sub-pixels 102s located between the end $E_{k+1}$ and the inner sub-pixels 104s of the pixel row $PR_{k+1}$ is four. In this embodiment, the distance between the outermost end sub-pixels in adjacent pixel rows is decreased and the number of the end sub-pixels in the pixel row is also decreased when the reference line RL is gradually changed from the curve line segment to the longitudinally extending line segment (e.g. parallel to the second direction D2). Accordingly, the edge of the display area that is gradually changed from the curved line segment to the longitudinally extending line segment viewed by the user can be smoother. According to the description above, the number of the end sub-pixels 102s located between an end and the inner sub-pixels 104s of a pixel row is related to the degree of curving of the reference line RL, and the numbers the end sub-pixels 102s in different pixel rows which are located in different regions (e.g. the regions R1A, R1B, R1C) may be different. In addition, because the region R1B is closer to a portion of the reference line RL extending laterally compared to the region R1A, the included angle between the first direction D1 and the direction from the outermost end sub-pixel 102s of the pixel row $PR_{j+1}$ toward the outermost end sub-pixel 102s of the pixel row $PR_j$ is greater than the included angle between the first direction D1 and the direction from the outermost end sub-pixel 102s of the pixel row $PR_{i+1}$ toward the outermost end sub-pixel 102s of the pixel row $PR_j$. Therefore, when the reference line RL is gradually changed from the curve line segment to the laterally extending line segment, the included angle between the first direction D1 and the direction from the outermost end sub-pixel of one of adjacent pixel rows toward the outermost end sub-pixel of the other one of the adjacent pixel rows is decreased. In another aspect, when the reference line RL is gradually changed from the curve line segment to the longitudinally extending line segment, the included angle between the first direction D1 and the direction from the outermost end sub-pixel of one of adjacent pixel rows toward the outermost end sub-pixel of the other one of the adjacent pixel rows is increased.

In another aspect, the display panel 10 includes a first pixel row (such as the pixel row $PR_j$ in FIG. 7), a second pixel row (such as the pixel row $PR_{j+1}$ in FIG. 7), a third pixel row (such as the pixel row $PR_i$ in FIG. 5), and a fourth pixel row (such as the pixel row $PR_{i+1}$ in FIG. 5). The first pixel row and the second pixel row are adjacent to each other along the second direction D2, and the third pixel row and the fourth pixel row are adjacent to each other along the second direction D2. The distance (such as the fourth distance T4 in FIG. 7) which is included between the outermost end sub-pixel 102s of the first pixel row and the outermost end sub-pixel 102s of the second pixel row is greater than the distance (the third distance T3 in FIG. 5) which is included between the outermost end sub-pixel 102s of the third pixel row and the outermost end sub-pixel 102s of the fourth pixel row. The number of the end sub-pixels 102s disposed between an end and the inner sub-pixels of the second pixel row is greater than the number of the end sub-pixels disposed between an end and the inner sub-pixels of the fourth pixel row (e.g. twenty-seven end sub-pixels 102s are included between the end $E_{j+1}$ and the inner sub-pixels 104s of the pixel row $PR_{j+1}$, and eight end sub-pixels 102s are included between the end $E_{i+1}$ and the inner sub-pixels 104s of the pixel row $PR_{i+1}$). Accordingly, the joint of portions of the edge of the display area having different curvatures viewed by the user can be smoother. Although the above description takes the pixel rows $PR_j$, $PR_{j+1}$ in FIG. 7 and the pixel rows $PR_i$ $PR_{i+1}$ in FIG. 5 as the first to the fourth pixel rows, respectively, but not limited thereto. For example, the first to the fourth pixel rows respectively may be the pixel row $PR_i$ in FIG. 5, the pixel row $PR_{i+1}$ in FIG. 5, the pixel row $PR_k$ in FIG. 8, and the pixel row $PR_{k+1}$ in FIG. 8, but not limited thereto. The distance between the outermost end sub-pixels in adjacent pixel rows and the number of end sub-pixels in the pixel row mentioned above are presented for explanation purpose only, and the present invention is not limited thereto.

The problem of serration of the curve edge of the display area AA viewed by the user can be reduced by the disposition of the aforementioned end sub-pixels 102s, thereby improving the display quality of the non-rectangular display panel 10. The design flow of this embodiment can be illustrated as follows: a plurality of pixels is arranged as a plurality of pixel rows and a plurality of pixel columns, the reference line RL crosses a portion of the sub-pixels when viewed in a direction perpendicular to the surface of the display panel 10, and the sub-pixel crossed with the reference line RL are designed as the aforementioned end sub-pixel 102*s*. When a plurality of end sub-pixels 102*s* are disposed between an end of a pixel row and the inner sub-pixels 104*s* of the pixel row, the areas of the display regions DR of the end sub-pixels 102*s* are increased along a direction from the end of the pixel row toward the inner sub-pixels 104*s* of the pixel row. Therefore, the areas of the display regions DR of the end sub-pixels 102*s* between an end of a pixel row and the inner sub-pixels 104*s* of the pixel row are gradually changed along a direction from the end of the pixel row toward the inner sub-pixels 104*s* of the pixel row, and the curve edge of the display area AA viewed by the user can be smoother. In the embodiment that a plurality of sub-pixels are included in each of the pixels (e.g. each of the pixels includes a red sub-pixel, a green sub-pixel, and a blue sub-pixel), when a portion of sub-pixels in the outermost pixel (e.g. one or two of three sub-pixels of the outermost pixel) is crossed with the reference line RL, each of the other portion of the sub-pixels that is not crossed with the reference line RL in the outermost pixel may be designed as the dummy sub-pixel 106*s*, and the region of the dummy sub-pixel 106*s* is completely covered by the shielding layer. The above design flow is only an example, and the present invention is not limited thereto.

In some embodiments, the actual contour of the display region of the pixel array can be checked again after the display panel 10 is designed according to the above method. At this time, the shielding layer (such as the black matrix layer BML) near the edge of the display region can be adjusted again so that the edge of the display region viewed by the user can conform to the shape of the initial design (such as the shape defined by the reference line RL). For example, as shown in FIG. 5, in the pixel row $PR_{i+1}$, the reference line RL crosses seven end sub-pixels 102*s* but does not cross the sub-pixel disposed on the right edge of the end sub-pixel 102R of the end pixel 1028. If the sub-pixel disposed on the right edge of the end sub-pixel 102R of the end pixel 1028 in the pixel row $PR_{i+1}$ is designed as the inner sub-pixel 104*s*, the user will notice that a portion of a displayed image located on a portion of an edge of the display area is abnormal because the difference between the area of the display region DR of the end sub-pixel 102R of the end pixel 1028 and the area of the display region DR of the inner sub-pixel 104*s* of the inner pixel 104 is too large. Therefore, the pixel disposed on the right edge of the end sub-pixel 102R of the end pixel 1028 in the pixel row $PR_{i+1}$ is designed as the end sub-pixel 102B of the end pixel 1029 in this embodiment, and the area of the display region DR of the end sub-pixel 102B of the end pixel 1029 is greater than the area of the display region DR of the end sub-pixel 102R of the end pixel 1028 but less than the area of the display region DR of the inner sub-pixel 104*s* of the inner pixel 104, so that the areas of the display regions of the pixels in the pixel row $PR_{i+1}$ are gradually changed along a direction from the end $E_{i+1}$ of the pixel row $PR_{i+1}$ toward the inner pixels 104 of the pixel row $PR_{i+1}$, thereby enabling the display panel 10 to have better visual effect. The above design flow is only an example, and the present invention is not limited thereto.

Referring to FIG. 3 to FIG. 8, all sub-pixels of an end pixel 102 in the first embodiment are end sub-pixels (e.g. each of the end pixel 102 is composed of three end sub-pixels 102R, 102G 102B as shown in FIG. 3), while in the second embodiment, all sub-pixels of an end pixel 102 are end sub-pixels (e.g. the end pixel 1028 is composed of three end sub-pixels 102R, 102G, 102B as shown in FIG. 5), or a portion of the end pixel 102 is composed of at least one end sub-pixel 102*s* and the other portion of the end pixel 102 is composed of at least one dummy sub-pixel 106*s* and/or at least one inner sub-pixel 104*s* (e.g. the outermost end pixel 102 in the pixel row $PR_{i+1}$ is composed of two dummy sub-pixels 106*s* and an end sub-pixel 102*s*, and the end pixel 1029 is composed of an end sub-pixel 102B and two inner sub-pixels 104*s* as shown in FIG. 5).

It should be noted that the first embodiment and the second embodiment only illustrate the end pixels 102, the end sub-pixels 102*s*, the dummy pixels 106, and the dummy sub-pixels 106*s* (also referred to as the first end pixels, the first end sub-pixels, the first dummy pixels, and the first dummy sub-pixels respectively) disposed between an end (also referred to as the first end) of the pixel row and the inner pixels 104 of the pixel row when the end of the pixel row is disposed in a region near the curve line segment of the reference line RL. When the other end of the pixel row (also referred to as the second end of the pixel row, which is opposite to the first end, and a plurality of pixels of the pixel row are disposed between the first end and the second end) is disposed in a region near another curve line segment of the reference line RL, the dispositions of the end pixels, the end sub-pixels, the dummy pixels, and the dummy sub-pixels (also referred to as the second end pixels, the second end sub-pixels, the second dummy pixels, and the second dummy sub-pixels respectively) disposed between the second end of the pixel row and the inner pixels 104 of the pixel row are similar to that of the first end pixels, the first end sub-pixels, the first dummy pixels, and the first dummy sub-pixels in the first embodiment and the second embodiment, and will not be redundantly described herein.

For example, as shown in FIG. 1, the display panel 10 includes a region R3 and a region R4 which are opposite to each other, and a portion of the display area AA located in the region R3 and another portion of the display area AA located in the region R4 have curve edges as shown in FIG. 1, at least one pixel row is partly located in the region R3 and the region R4, and the pixel row includes the first end and the second end respectively disposed in the region R3 and the region R4, the first end pixels are included between the first end of the pixel row and the inner pixels of the pixel row, and the second end pixels are disposed between the second end of the pixel row and the inner pixels of the pixel row. For example, a pixel row includes a plurality of pixels, and the pixels include at least one first end pixel, at least one second end pixel and a plurality of inner pixels. The pixel row has a first end and a second end which are opposite to each other and respectively located in the region R3 and the region R4, the at least one first end pixel is located between the first end and the at inner pixels, and the at least one second end pixel is located between the second end and the inner pixels. In some embodiments, in a pixel row including a plurality of first end pixels and a plurality of second end pixels, the areas of the display regions of the first end pixels are increased along the direction from the first end of the pixel row toward the inner pixels, and the areas of the display regions of the second end pixels are increased along the direction from the second end of the pixel row toward the inner pixels. In addition, one or more first dummy pixels may be disposed between the first end of the pixel row and the first end pixels, and one or more second dummy pixels may be disposed between the second end of the pixel row and the second end pixels, but not limited thereto. In some embodiments, in a pixel row including a plurality of first end sub-pixels and a plurality of second end sub-pixels, the areas of the display regions of the first end sub-pixels are increased along the direction from the first end of the pixel row toward the inner pixels, and the areas of the display regions of the second end sub-pixels are increased along the direction from the second end of the pixel row toward the inner pixels. In addition, one or more first dummy sub-pixels may be disposed between the first end of the pixel row and the first end sub-pixels, and one or more second dummy sub-pixels may be disposed between the second end of the pixel row and the second end pixels, but not limited thereto.

In addition, it should be noted that the first embodiment and the second embodiment illustrate that a pixel is composed of three sub-pixels, but the present invention is not limited thereto. In the embodiment where a pixel is composed of a sub-pixel, two sub-pixels, or more than three sub-pixels, the dispositions of the end pixel, the end sub-pixel, the inner pixel, the inner sub-pixel, the dummy pixel, and the dummy sub-pixel are similar to the first and the second embodiments, and will not be redundantly described herein.

To sum up, in a portion of the display area having the curve edge in the display panel of the present invention, the area of the display region of the end sub-pixel is less than the area of the display region of the inner sub-pixel. In the same pixel row, the areas of the display regions of the end pixels are increased along the direction from the end of the pixel row toward the inner pixels of the pixel row. In one embodiment, the display region of each of the end sub-pixels includes an inclined edge, and the extending direction of the inclined edge is approximately parallel to the extending direction of the reference line. The included angle included between the extension lines of the inclined edges of the display regions of the end sub-pixels in two adjacent pixel rows is less than or equal to 5 degrees. In another embodiment, the areas of the display regions of the end sub-pixels in each pixel row are increased along the direction from the end of the pixel row toward the inner sub-pixels of the pixel row, and the areas of the display regions of the end sub-pixels in the same end pixel can be different. The top edge and the bottom edge of the display region of the end sub-pixel are parallel to the first direction. In the present invention, the distance between the outermost end sub-pixels in adjacent pixel rows is increased and the number of the end sub-pixels in the pixel row is also increased when the reference line is gradually changed from the curve line segment to the laterally extending line segment. In another aspect, the distance between the outermost end sub-pixels in adjacent pixel rows is decreased and the number of the end sub-pixels in the pixel row is also decreased when the reference line is gradually changed from the curve line segment to the longitudinally extending line segment. The arrangement of pixels of the non-rectangular display panel of the present invention includes the above-mentioned characteristics. The problem of serration of the curve edge of the display area can be reduced, and the curve edge of the display area viewed by the user can be smoother, thereby improving the display quality of the non-rectangular display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel including a non-rectangular display area, comprising:
   a first pixel row, wherein the first pixel row comprises:
      a plurality of inner sub-pixels disposed in the non-rectangular display area; and
      a plurality of end sub-pixels disposed between an end of the first pixel row and the inner sub-pixels, wherein each of the inner sub-pixels and the end sub-pixels comprises a shielding member, the shielding member is a portion of a black matrix layer, and an area of the shielding member of each of the end sub-pixels is greater than an area of the shielding member of each of the inner sub-pixels,
   wherein the areas of the shielding members of the end sub-pixels are different from each other and sequentially reduced along a direction from the end of the first pixel row toward the inner sub-pixels,
   wherein each of the shielding members comprises an opening, each of the opening includes a first top edge and a first bottom edge which are opposite to each other, and each of the end sub-pixels includes a second top edge and a second bottom edge which are opposite to each other, and
   wherein a first distance is included between the first top edge and the second top edge and a second distance is included between the first bottom edge and the second bottom edge in each of the end sub-pixels, the first distances of the end sub-pixels are sequentially reduced along the direction from the end of the first pixel row toward the inner sub-pixels, and the second distances of the end sub-pixels are sequentially reduced along the direction from the end of the first pixel row toward the inner sub-pixels.

2. A display panel including a non-rectangular display area, comprising:
   a first pixel row, a second pixel row, a third pixel row, and a fourth pixel row, wherein an $i^{th}$ pixel row of the first pixel row to the fourth pixel row comprises:
      a plurality of inner pixels disposed in the non-rectangular display area; and
      a plurality of end pixels disposed between an end of the $i^{th}$ pixel row and the inner pixels of the $i^{th}$ pixel row, wherein an area of a display region of each of the end pixels of the $i^{th}$ pixel row is less than an area of a display region of each of the inner pixels of the $i^{th}$ pixel row,
   wherein i is an integer that is greater than or equal to 1 and is smaller than or equal to 4, and the areas of the display regions of the end pixels of the $i^{th}$ pixel row are increased along a direction from the end of the $i^{th}$ pixel row toward the inner pixels of the $i^{th}$ pixel row,
   wherein the end pixel located outermost in the $i^{th}$ pixel row is an outermost end pixel of the $i^{th}$ pixel row, the first pixel row is adjacent to the second pixel row, a first distance is included between the outermost end pixel of the first pixel row and the outermost end pixel of the second pixel row, the third pixel row is adjacent to the fourth pixel row, a second distance is included between the outermost end pixel of the third pixel row and the outermost end pixel of the fourth pixel row, the first distance is greater than the second distance, and a number of the end pixels of the second pixel row is greater than a number of the end pixels of the fourth pixel row.

3. A display panel including a non-rectangular display area, comprising:
   a first pixel row, a second pixel row, a third pixel row, and a fourth pixel row, wherein an $i^{th}$ pixel row of the first pixel row to the fourth pixel row comprises:
      a plurality of inner pixels disposed in the non-rectangular display area; and
      a plurality of end pixels disposed between an end of the $i^{th}$ pixel row and the inner pixels of the $i^{th}$ pixel row, wherein an area of a display region of each of the end pixels of the $i^{th}$ pixel row is less than an area of a display region of each of the inner pixels of the $i^{th}$ pixel row,
   wherein i is an integer that is greater than or equal to 1 and is smaller than or equal to 4, and the areas of the display regions of the end pixels of the $i^{th}$ pixel row are increased along a direction from the end of the $i^{th}$ pixel row toward the inner pixels of the $i^{th}$ pixel row,
   wherein each of the end pixels comprises at least one end sub-pixel, the end sub-pixel located outermost in the $i^{th}$ pixel row is an outermost end sub-pixel of the $i^{th}$ pixel row, the first pixel row is adjacent to the second pixel row, a first distance is included between the outermost end sub-pixel of the first pixel row and the outermost end sub-pixel of the second pixel row, the third pixel row is adjacent to the fourth pixel row, a second distance is included between the outermost end sub-pixel of the third pixel row and the outermost end sub-pixel of the fourth pixel row, the first distance is greater than the second distance, and a number of the end sub-pixels of the second pixel row is greater than a number of the end sub-pixels of the fourth pixel row.

4. The display panel of claim 1, wherein the first distance is equal to the second distance in each of the end sub-pixels.

5. The display panel of claim 1, wherein the first top edge is parallel to the first bottom edge in each of the end sub-pixels.

6. A display panel including a non-rectangular display area, comprising:
   a first pixel row, wherein the first pixel row comprises:
      a plurality of inner sub-pixels disposed in the non-rectangular display area; and
      a plurality of end sub-pixels disposed between an end of the first pixel row and the inner sub-pixels, wherein each of the inner sub-pixels and the end sub-pixels comprises a shielding member, the shielding member is a portion of a black matrix layer, and an area of the shielding member of each of the end sub-pixels is greater than an area of the shielding member of each of the inner sub-pixels,
      wherein the areas of the shielding members of the end sub-pixels are different from each other and sequentially reduced along a direction from the end of the first pixel row toward the inner sub-pixels,
   wherein the end sub-pixels comprises a first end sub-pixel, a second end sub-pixel and a third end sub-pixel, the first end sub-pixel is located between the end of the first pixel row and the second end sub-pixel, the third end sub-pixel is located between the second end sub-pixel and the inner sub-pixels, an area of the shielding member of the first end sub-pixel is greater than an area of the shielding member of the second end sub-pixel, and the area of the shielding member of the second end sub-pixel is greater than an area of the shielding member of the third end sub-pixel.

7. The display panel of claim 6, wherein the first pixel row comprises a plurality of inner pixels and an end pixel disposed between the end of the first pixel row and the inner pixels, each of the inner pixels includes three of the inner sub-pixels, and the end pixel includes the first end sub-pixel, the second end sub-pixel and the third end sub-pixel.

8. A display panel including a non-rectangular display area, comprising:
   a first pixel row, wherein the first pixel row comprises:
      a plurality of inner sub-pixels disposed in the non-rectangular display area; and
      a plurality of end sub-pixels disposed between an end of the first pixel row and the inner sub-pixels, wherein each of the inner sub-pixels and the end sub-pixels comprises a shielding member, the shielding member is a portion of a black matrix layer, and an area of the shielding member of each of the end sub-pixels is greater than an area of the shielding member of each of the inner sub-pixels,
      wherein the areas of the shielding members of the end sub-pixels are different from each other and sequentially reduced along a direction from the end of the first pixel row toward the inner sub-pixels,
   wherein the end sub-pixels comprises a first end sub-pixel, the first pixel row further comprises at least one dummy sub-pixel disposed between the end of the first pixel row and the first end sub-pixel, and a region of the dummy sub-pixel is completely covered by the black matrix layer,
   wherein a number of the at least one dummy sub-pixel is two, the first pixel row comprises a plurality of inner pixels and an end pixel disposed between the end of the first pixel row and the inner pixels, each of the inner pixels includes three of the inner sub-pixels, and the end pixel includes the dummy sub-pixels and the first end sub-pixel.

9. A display panel including a non-rectangular display area, comprising:
   a first pixel row, wherein the first pixel row comprises:
      a plurality of inner sub-pixels disposed in the non-rectangular display area; and
      a plurality of end sub-pixels disposed between an end of the first pixel row and the inner sub-pixels, wherein each of the inner sub-pixels and the end sub-pixels comprises a shielding member, the shielding member is a portion of a black matrix layer, and an area of the shielding member of each of the end sub-pixels is greater than an area of the shielding member of each of the inner sub-pixels,
      wherein the areas of the shielding members of the end sub-pixels are different from each other and sequentially reduced along a direction from the end of the first pixel row toward the inner sub-pixels,
   wherein the end sub-pixels comprises a first end sub-pixel, the first pixel row further comprises at least one dummy sub-pixel disposed between the end of the first pixel row and the first end sub-pixel, and a region of the dummy sub-pixel is completely covered by the black matrix layer,
   wherein the end sub-pixels further comprises a second end sub-pixel located between the first end sub-pixel and the inner sub-pixels, an area of the shielding member of the first end sub-pixel is greater than an area of the shielding member of the second end sub-pixel, a number of the at least one dummy sub-pixel is one, the first pixel row comprises a plurality of inner pixels and an end pixel disposed between the end of the first pixel row and the inner pixels, each of the inner pixels includes three of the inner sub-pixels, and the end pixel includes the dummy sub-pixel, the first end sub-pixel and the second end sub-pixel.

10. A display panel including a non-rectangular display area, comprising:
   a first pixel row, wherein the first pixel row comprises:
      a plurality of inner sub-pixels disposed in the non-rectangular display area; and
      a plurality of end sub-pixels disposed between an end of the first pixel row and the inner sub-pixels, wherein each of the inner sub-pixels and the end sub-pixels comprises a shielding member, the shielding member is a portion of a black matrix layer, and an area of the shielding member of each of the end sub-pixels is greater than an area of the shielding member of each of the inner sub-pixels,
   wherein the areas of the shielding members of the end sub-pixels are different from each other and sequentially reduced along a direction from the end of the first pixel row toward the inner sub-pixels,
   wherein the end of the first pixel row is a first end of the first pixel row, the first pixel row further comprises a plurality of end sub-pixels disposed between a second end of the first pixel row and the inner sub-pixels,
   wherein the first end and the second end are opposite to each other, each of the end sub-pixels disposed between the second end of the first pixel row and the inner sub-pixels comprises a shielding member which is a portion of the black matrix layer, and an area of the shielding member of each of the end sub-pixels disposed between the second end of the first pixel row and the inner sub-pixels is greater than the area of the shielding member of each of the inner sub-pixels,
   wherein the areas of the shielding members of the end sub-pixels disposed between the second end of the first pixel row and the inner sub-pixels are different from each other and sequentially reduced along a direction from the second end of the pixel row toward the inner sub-pixels.

11. The display panel of claim 2, wherein each of the end pixels of the $i^{th}$ pixel row comprises a plurality of end sub-pixels corresponding to different colors, and areas of display regions of the end sub-pixels corresponding to a same color are increased along the direction from the end of the $i^{th}$ pixel row toward the inner pixels of the $i^{th}$ pixel row.

12. The display panel of claim 2, wherein each of the end pixels comprises at least one end sub-pixel, each of the end sub-pixels comprises a plurality of side edges, a display region of each of the end sub-pixels comprises an inclined edge, and the inclined edge is not parallel to the side edges.

13. The display panel of claim 12, wherein each of the end pixels comprises a plurality of end sub-pixels, and the inclined edges of the display regions of the end sub-pixels in one of the end pixels are parallel to each other.

14. The display panel of claim 3, wherein each of the end sub-pixels comprises a shielding member, each of the shielding members comprises an opening, each of the openings includes a first top edge and a first bottom edge which are opposite to each other, and each of the end sub-pixels includes a second top edge and a second bottom edge which are opposite to each other,
   wherein a first distance is included between the first top edge and the second top edge and a second distance is included between the first bottom edge and the second bottom edge in each of the end sub-pixels, the first distances of the end sub-pixels of the $i^{th}$ pixel row are sequentially reduced along the direction from the end of the $i^{th}$ pixel row toward the inner pixels of the $i^{th}$ pixel row, and the second distances of the end sub-pixels are sequentially reduced along the direction from the end of the $i^{th}$ pixel row toward the inner pixels of the $i^{th}$ pixel row.

15. The display panel of claim 14, wherein the first distance is equal to the second distance in each of the end sub-pixels.

16. The display panel of claim 14, wherein the first top edge is parallel to the bottom edge in each of the end sub-pixels.

* * * * *